United States Patent [19]
Gürs

[11] 3,951,768
[45] Apr. 20, 1976

[54] METHOD OF SEPARATING ISOTOPES
[76] Inventor: Karl Gürs, Weissdornweg 23, Niederhochstadt, Germany
[22] Filed: Oct. 17, 1973
[21] Appl. No.: 407,246

Related U.S. Application Data
[63] Continuation-in-part of Ser. No. 113,094, Feb. 5, 1971, abandoned.

[52] U.S. Cl. ................. 204/157.1 R; 204/DIG. 11
[51] Int. Cl.² ............................................. B01J 1/10
[58] Field of Search ............. 204/157.1 R, DIG. 11; 250/283, 282

[56] References Cited
UNITED STATES PATENTS
3,443,087  5/1969  Robieux et al. ................. 204/157.1
3,719,454  3/1973  Shang .......................... 204/DIG. 11

OTHER PUBLICATIONS
Mayer et al., Applied Physics Letters, Vol. 17, No. 12, (Dec. 15, 1970), pp. 516–519.

Primary Examiner—Howard S. Williams
Attorney, Agent, or Firm—Christen & Sabol

[57] ABSTRACT

A method for separating isotopes is disclosed. Molecules in a gaseous state which contains isotopes including a selected isotope, are irradiated by means of a laser. The molecules containing the selected isotope have an absorption line corresponding to an emission line of the laser. The selected isotope in the molecules having the corresponding absorption line participates in the resultant oscillation of those molecules. This irradiation of the absorbing molecules having the selected isotope chemically converts them to other entities. The other entities containing said isotopes are separated out so that the isotopes can be collected. Perferably, the isotopes are isotopes of uranium, and more preferably the $U^{235}$ and $U^{238}$, which are subjected to the above method to separate out a selected isotope.

14 Claims, No Drawings 3,951,768

METHOD OF SEPARATING ISOTOPES

This is a continuation-in-part of application Ser. No. 113,094, filed Feb. 5, 1971, now abandoned.

BROAD DESCRIPTION OF THIS INVENTION

Isotopes of an element can be separated by the method of this invention. Molecules (compounds) of the element are placed in a gaseous state, say by heating the molecules. Useful molecules must have an absorption line (rotation-oscillation line) corresponding to an emission line of a laser for one of the isotopes. The molecules of the gaseous state are irradiated by means of the laser, preferably a $CO_2$ laser. The irradiation causes activation of the molecules containing the selected isotope. This causes a chemical conversion of the absorbing molecule. The chemical conversion can be any known chemical conversion. In one preferred embodiment of this invention the molecular gas can be molecules of a compound, preferably a uranium compound, such as, $U(BH_4)_4$, which decomposes as a result of the energy supplied by the irradiation. In this embodiment the addition of a coreactant is unnecessary. In another preferred embodiment of this invention the molecules and one or more coreactants are added to the molecular gas, and the coreactant reacts with the activated molecules. After the chemical conversion of the absorbing molecules, the chemical conversion products are separated in a known manner, for example, by fractional condensation.

Before irradiating with the laser light, it is often advantageous to bring the molecular gas to a temperature at which the chemical conversion, for example, chemical reaction and/or the decomposition reaction, is just beginning.

A buffering gas, particularly an inert gas, can be added to the molecular gas to be irradiated.

This invention can be used to separate two or more isotopes, preferably $U^{235}$ and $U^{238}$. It should be noted that this invention can be used to separate fissionable species, such as, $U^{233}$, $U^{235}$ or $Pu^{239}$, from other isotopes.

The advantage obtained by the method of this invention is primarily the simplification of, and thus a cost reduction, in the process of concentrating of certain isotopes of certain metals and non-metals, such as, the concentration of $U^{235}$ for energy production fuels.

As used herein the term "chemical conversion" encompasses all chemical reactions producing other chemical entities such as, decomposition of molecules, chemical combination of one or more reactants (including where the desired product and other products e.g., water, are produced), etc. The term "chemical entity" means elements and/or molecules.

DETAILED DESCRIPTION OF THIS INVENTION

This invention can be used to separate non-naturally occurring isotopes, to separate naturally-occurring isotopes and non-naturally occurring isotopes, and to separate naturally occurring isotopes. This invention can be used to separate any type of isotopes, but preferably isotopes of metals, such as, uranium. The isotopes can be fissionable species. Shielding requirements and other similar processing requirements necessary to conduct the process of the above types is well within the skill of those ordinarily skilled in the art.

Many different inorganic or organic molecules (compounds) may be used for isotope separation of uranium isotopes according to this invention, for example, $UF_6$, $UF_5Cl$, $UCl_6$, $U(BH_4)_4$, $UCl_5F$, $UF_2Cl_4$, $UCl_3F_3$, $UO_2(NO_3)_2 \cdot 6H_2O$, etc. This invention is preferably used to separate uranium isotopes. The preferred uranium compound for use in this invention is $UF_6$ because, for example, of its low melting point and low boiling point make the operational features of the process of this invention much easier. Although, $U(BH_4)_4$ is a preferred uranium compound when the molecular decomposition embodiment of this invention is used.

An example of useful plutonium compound is $PuCl_3$. An example of a useful thorium compound is $Th(C_5H_7O_2)_4$. Examples of useful germanium compounds are $GeCl_3F$, $GeCl_2F_2$, $GeH_3Cl$, $GeCl_4$, $GeH_2Br_2$, and $GeBr_4$. Examples of useful selenium compounds are $SeOF_2$, $SeC_2$, $SeF_4$, $SeOCl_2$ and $SeSO_3Cl_4$.

As naturally-occurring arsenic has essentially only one type of isotope, it can be used to separate isotopes of non-metals. Arsenic trichloride boils at 63°C. (752 m.m), so that compound can be used in the method of this invention to separate the $Cl^{35}$ and $Cl^{37}$ isotopes of chlorine. This is an example of the breadth of this invention.

Examples of naturally occurring isotopes which can be separated by this invention: $H^1$, $H^2$, $Li^6$, $Li^7$, $B^{10}$, $B^{11}$, $C^{12}$, $C^{13}$, $Mg^{24}$, $Mg^{25}$, $Mg^{26}$, $Si^{28}$, $Si^{29}$, $Si^{30}$, $Cl^{35}$, $Cl^{37}$, $S^{32}$, $S^{33}$, $S^{34}$, $S^{36}$, $Ne^{20}$, $Ne^{21}$, $Ne^{22}$, $K^{39}$, $K^{40}$, $K^{41}$, $Ca^{40}$, $Ca^{42}$, $Ca^{43}$, $Ca^{44}$, $Ca^{46}$, $Ca^{48}$, $Cr^{52}$, $Cr^{53}$, $Cr^{54}$, $Cu^{63}$, $Cu^{65}$, $Ga^{69}$, $Ga^{71}$, $Ge^{70}$, $Ge^{72}$, $Ge^{73}$, $Ge^{74}$, $Ge^{76}$, $Se^{74}$, $Se^{76}$, $Se^{77}$, $Se^{78}$, $Se^{80}$, $Se^{82}$, $Br^{79}$, $Br^{81}$, $Mo^{92}$, $Mo^{94}$, $Mo^{95}$, $Mo^{96}$, $Mo^{97}$, $Mo^{98}$, $Mo^{100}$, $Ba^{132}$, $Ba^{134}$, $Ba^{135}$, $Ba^{136}$, $Ba^{137}$, $Ba^{138}$, $La^{138}$, $La^{139}$, $Nd^{142}$, $Nd^{143}$, $Nd^{144}$, $Nd^{145}$, $Nd^{146}$, $Nd^{148}$, $Nd^{150}$, $Ce^{136}$, $Ce^{138}$, $Ce^{140}$, $Ce^{142}$, $U^{234}$, $U^{235}$, $U^{238}$, etc.

This invention is based on the fact that the oscillating energy of the molecule depends substantially on the mass of the atoms involved. For many molecules a formula of the type "$(d\gamma/\gamma)$ equals $(d\mu/2\mu)$" applies, i.e., the relative variation of the frequency of the oscillation is equal to half the relative variation of the reduced mass $\mu$. The definition of the reduced mass depends on the type of molecule. One can also refer to the mass of the isotope in question. For certain normal oscillation, where the isotope is involved in the oscillation, it can then be said that: the relative frequency variation is of an order of magnitude approximately equal to the relative mass variation.

The Doppler width of the molecule spectral lines (absorption lines) is only some ten megahertz, depending on the molecular mass. One must then operate in a pressure range ( $\leq$ 1 atm) in which the pressure distribution does not yet lead to undesirable overlapping of the absorption lines. Thus when monocromatic light is radiated into one absorption line only molecules with the type of isotopes in question are activated and not the other molecules. The activation is thus specific to the isotope. For example, taking certain steps (lowering pressure, adding buffering gas and/or coreactants) one can further ensure that no troublesome transmission of energy from the molecule with $U^{235}$ to the molecule with $U^{238}$, or vice versa, will take place through collisions of the second kind.

In the spectral range under consideration (near to medium infra-red) lasers with more than a thousand lines are available. Only the $CO_2$ laser emits over 300 lines in the spectral range between 9 and 11.5 $\mu$m, if one considers the possibility of using as the laser the CO₂ lasers of various (different) carbon and oxygen isotopes. The laser may in a suitable arrangement be modulated selectively to each of these lines. (Within the scope of this invention, any laser can be used, generally a $CO_2$ laser is preferred, to irradiate the molecular gas, etc., but certain lasers may be necessary for use with certain isotopes.)

Molecules, from which a certain isotope of a certain atom in the molecule has to be separated, also have a large number of adsorption lines; numerous transitions are possible between the many rotation-oscillation levels. A certain molecule has up to some hundreds of absorption lines, depending on the structure.

The absorption lines of all possible molecules lie very close to one another. The mean spacing between the adsorption lines is far smaller than 300 times the mean width of the lines. This means that some emission lines of the lasers (particularly of the $CO_2$ laser) lie on certain (specific) absorption lines of suitable gases.

Activation depends also on the isotopic weight of the other atoms still present in the molecule in question. By other atoms is meant other than the isotopes which one is actually seeking to separate by the method of this invention. It is therefore desirable always to use other atoms which contain only one type of isotope. This way the separation factor after the chemical conversion is enhanced. The use of such isotopically pure materials makes the method of the invention easier, but the isotopes can be repeatedly recovered. Furthermore, elements such as chlorine or boron can be separated with relative ease according to their isotopes. It is particularly desirable to use fluorine (for example, in $UF_6$) as fluorine has essentially only one type of naturally-occurring isotope. Examples of other elements which have essentially only one type of naturally-occurring isotopes are beryllium, sodium, aluminum, phosphorous, scandium, manganese, arsenic, niobium, iodine, etc. In using the above type of listing, it must be remembered isotopes of non-metals can be separated by the method of this invention.

The absorption of a quantum of light represents a supply of energy, and such a supply of energy has the same effect as a rise in temperature as far as the initiation of certain chemical reactions is concerned. Absorption means excitation of oscillation, while a temperature rise means the supply of kinetic energy. The absorption of a quantum of light of 10.6 μm wave lengths corresponds to a temperature rise of about 1000°C. In the presence of suitable coreactants the rate of chemical reactions increases, or the rate of decomposition of the molecule increases. The process of this invention then relates only to the activated molecules and thus only to the molecules with a certain type of isotope. The reaction speed is proportional to a factor $\exp(-E/kT)$, wherein E represents the activation energy in specific definition. This is reduced by the excitation energy $\Delta E$ on excitation of suitable molecular oscillations. $E-\Delta E$ then stands in the experiment instead of E, that is to say, the reaction speed is increased by the factor $F = \exp(+\Delta E/kT)$. For room temperature and $\Delta E = 0.116$ eV ($CO_2$ laser), we have found that $F = 108$. A reaction starting at room temperature is thus amplified by the factor 108 by the laser radiation in the case of all the molecules in question being excited.

The activation energy plays a part, in that where there is much activation energy the reaction speed may be too low for a technical application. If the temperature has to be raised to 300°C. in order to obtain any appreciable reaction, the increase in the reaction speed by laser radiation will be reduced to a factor of 10. The method of the invention is therfore preferably carried out with reactions which take place at an appreciable speed at what is termed a low temperature. This normally means temperatures between about room temperature and about 300°C., and even more preferably below about 150°C. Temperatures above and below the above range can be used.

As already explained many different inorganic or organic compounds with uranium, such as, $UF_6$, $UF_5Cl$, can be used for carrying out the process according to this invention. Which laser must be used in the individual case depends on the absorption spectrum of the compound used in each instance for the process.

If for example, a $UF_6$, which practically exists only in a single variety of isotopes and which is therefore particularly suitable, is used for the separation of isotopes then, for example, one would consider the use of a $CO_2$ laser because, as is well known, $UF_6$ absorbs the $CO_2$ laser radiation: at 1063 cm$^{-1}$ in the range of the combination bands $\gamma_1 + \gamma_4 + \gamma_5$, at 1098 cm$^{-1}$ in the range of the bands $\gamma_1 + \gamma_3 - \gamma_5$, and at 1111 cm$^{-1}$ in the range of the bands $\gamma_1 + \gamma_3 - \gamma_4$. The absorption of the laser radiation becomes selective and specific as to isotopes whenever the pressures is lowered to a point that the absorption bands dissolve into individual lines. In order to obtain a complete separation of most lines one must reduce the pressure to below 10 torr.

In that case an isotope and specific absorption of a few laser lines is accomplished by one or the other $UF_6$ variety.

Thus, according to this invention, one or the other $UF_6$ variety can be activated specifically at this pressure. The ordinary knowledge in the field is sufficient to carry out such experments. experiments.

The selection of the logically added reaction partner is likewise entirely dependent on the compound used. The following are suitable as reaction partners, e.g., NO, $NO_2$, $SO_2$, $SiH_4$, HCl.

The most favorable temperature of the reaction mixture depends on a number of technical conditions which in each instance can be determined with a minimum of experimentation. It is important how fast the gas can be pumped through the reaction test cell at the given laser performance.

The following examples illustrate that the specific experimental conditions can easily be determined, without undue experimentation, by one ordinarily skilled in the art.

FIRST EXAMPLE

A $CO_2$ laser was used, which in the range of the combination bands $\gamma_1 + \gamma_4 + \gamma_5$ at 1063 cm$^{-1}$ potential could be attuned to individual lines. A line was used which was absorbed only by $U^{235}F_6$ and not by $U^{238}F_6$. Such lines are easy to find whenever the prressure of the reaction mixture is reduced to below 20 torr. A favorable reaction mixture consisted on one part by volume of $UF_6$ and 5 parts by volume of NO. Depending on the desired throughput volume and the corresponding laser performance, the temperature in each case was between −60° and 20°C. In order to separate 1 mole of $U^{235}$ per hour, and depending on the special experimental conditions, a laser performance of 30 W to 1 kW was sufficient.

SECOND EXAMPLE

With the other conditions of the first example unchanged, a CO laser in the range of 3 $\gamma_3$ absorption bands were used at 1869 cm$^{-1}$.

THIRD EXAMPLE

A CO laser and most of the conditions of the first example were used. The reaction mixture consisted of 1 part of $UF_6$ with about 5 parts of $SiH_4$. The operating temperature was at 30° to 50°C. lower than in the first example.

What we claim is:

1. A method for separating isotopes which comprises: (a) irradiation molecules in a gaseous state, which contains isotopes including a selected isotope, by means of a laser, said molecules containing said selected isotope having an absorption line corresponding to an emission line of said laser and said selected isotope in said molecules having said corresponding absorption line participates in the resultant oscillation of said molecules, whereby (b) said absorbing molecules having said selected isotope are chemically converted to other entities; and (c) separating out that portion of said other entities which contain, or are, said selected isotope.

2. A method according to claim 1 wherein, before step (a), said molecules containing said isotopes is heated to place said molecules in a gaseous state.

3. A method according to claim 2 wherein said isotopes are isotopes of uranium.

4. A method according to claim 3 wherein said isotopes are $U^{235}$ and $U^{238}$.

5. A method according to claim 1 wherein, before said step (a), said molecules are brought to a temperature at which said chemical conversion is just beginning.

6. a method according to claim 1 wherein said separation step (c) is achieved by means of fractional condensation.

7. a method according to claim 1 wherein said laser is a $CO_2$ laser.

8. A method according to claim 1 wherein at least one coreactant is added to said molecules in step (a) and wherein said coreactant reacts preferentially with said absorbing molecules.

9. A method according to claim 8 wherein said coreactant contains an atom or atoms which each only contain one type of isotope.

10. A method according to claim 8 wherein said coreactant is naturally-occurring fluorine, berylium, sodium, aluminum, phosphorous, scandium, manganese, arsenic, niobium or iodine.

11. A method according to claim 1 wherein said molecules in step (a) is comprised of molecules which decomposes when energy is supplied by the irradiation.

12. A method according to claim 11 wherein said molecules are $U(BH_4)_4$ $UF_6$.

13. A method according to claim 1 wherein a buffering gas is added to the molecular gas.

14. A method according to claim 13 wherein said buffering gas is an inert gas.

* * * * *

UNITED STATES PATENT OFFICE
CERTIFICATE OF CORRECTION

PATENT NO. : 3,951,768
DATED : April 20, 1976
INVENTOR(S) : Karl Gurs

It is certified that error appears in the above-identified patent and that said Letters Patent are hereby corrected as shown below:

In Claim 1, line 1, between "irradiation" and "molecules", insert --of--.

In Claim 10, line 1, cancel "claim 8" and insert therefor --claim 9--.

In Claim 10, line 2, cancel "coreactant is" and insert therefor --atom or atoms are--.

Signed and Sealed this

Twenty-eighth Day of December 1976

[SEAL]

Attest:

RUTH C. MASON
Attesting Officer

C. MARSHALL DANN
Commissioner of Patents and Trademarks